Feb. 22, 1927.
E. LUNN
1,618,764
PROCESS OF SPOT WELDING OF ALUMINUM
Filed Sept. 3, 1926
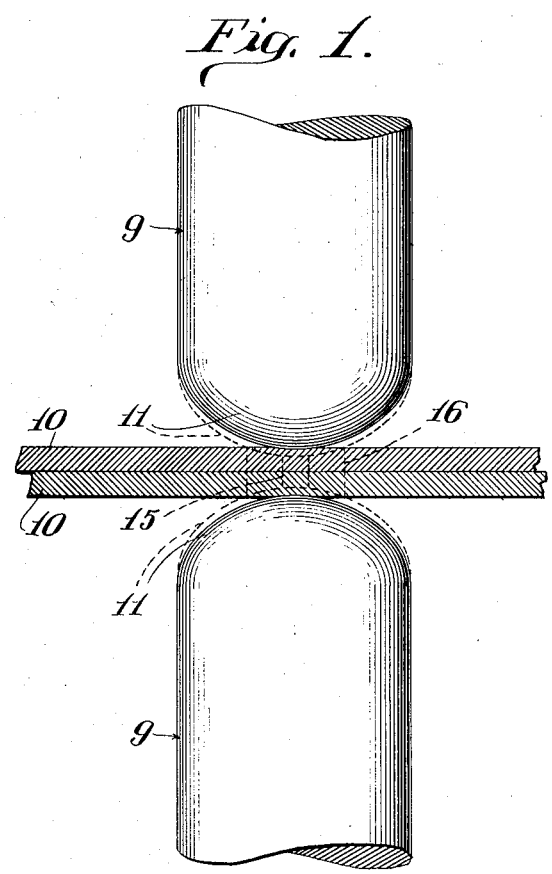
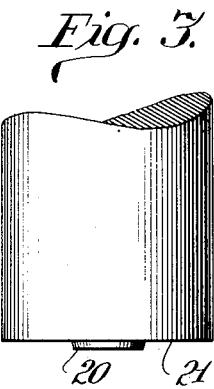
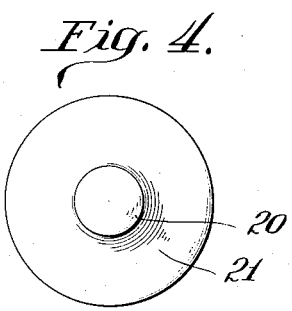
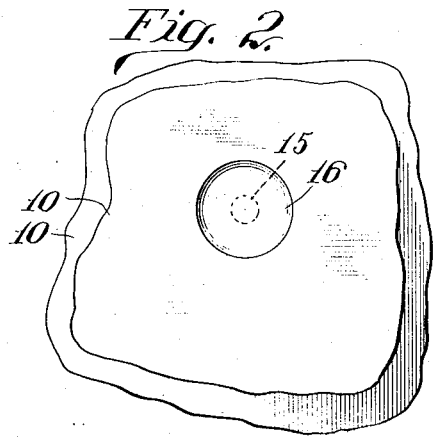
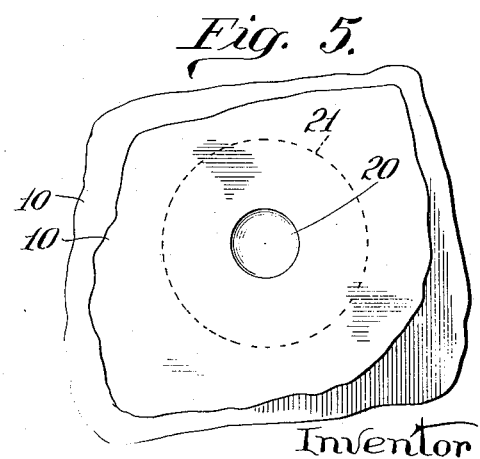
Inventor
ERNEST LUNN.
By Oscar Hochberg.
his Attorney Patented Feb. 22, 1927.

1,618,764

UNITED STATES PATENT OFFICE.

ERNEST LUNN, OF CHICAGO, ILLINOIS, ASSIGNOR TO PULLMAN CAR AND MANUFACTURING CORPORATION, OF CHICAGO, ILLINOIS, A CORPORATION OF ILLINOIS.

PROCESS OF SPOT WELDING OF ALUMINUM.

Application filed September 3, 1926. Serial No. 133,439.

This invention relates to the process of spot-welding sheet aluminum and aluminum alloys and has for its object to insure regularity in the welding operation and uniformity in the character of the welds produced.

Heretofore, in the practice of spot-welding aluminum sheets, it frequently happened that the welded spots would be insufficient in area to develop the strength of the sheets welded, owing to the lack of sufficient metal having been melted by the passage of current between the points of contact, or the aluminum would be blown out because of the operator's inability to stop further heating at the instant that sufficient metal has been melted to form a satisfactory weld.

Figure 1 shows electrodes adapted to carry out my invention.

Figures III and IV show a modification of the electrode structure.

Figures II and V show relation of areas of initial and final contact of the electrodes whereby the reduction in current density is affected to curtail further welding.

In practicing my invention, the electrodes are so shaped that the further melting of the aluminum would cease at the instant that a sufficient amount of metal had been melted to form a proper weld. As shown in Fig. 1 of the accompanying drawing the electrodes 9 are preferably rounded off at their ends and are made to contact with the aluminum sheets to be welded. When the sheets 10 are placed between the electrode tips 11 as shown in this figure and pressure applied before current is turned on, the area of contact between the hemispheroidal tips 11 and the aluminum sheets is comparatively small so that a predetermined amount of electric current of sufficent density could be passed through this area to cause a melting heat to be set up in the relatively small column of metal 15 under pressure of the electrodes at points of contact.

The melting of this column of metal will cause the material in this area to yield under pressure from the electrodes and permit the electrode tips 11 to sink into the softened surface of the aluminum sheets 10, thereby causing the area in contact and under pressure from the electrodes to become greatly enlarged as indicated at 16 in Fig. 2 of the drawing and in dotted lines in Fig. 1 thereof. Since there has been no corresponding increase in the amount of welding current above that used in the smaller initial area of contact 15, the instant that the electrodes sink into the surface of the aluminum sheets and the area of contact and pressure becomes enlarged, the current density per square inch is so greatly reduced that its heating effect becomes insufficient to cause the melting of the additional volume of aluminum contained within the larger area 16.

The increase in the area of contact as the sheets yield to the pressure of the electrodes becomes instantly effective to check or reduce the heating value of the welding current to prevent further melting or overheating of the sheets. Although electrodes having tips 11 of hemi-spheroidal form are preferred because of their capacity for progressively increasing the area of contact with respectively adjacent sheets 10 when pressure is applied, the extreme tips may be flat and relatively small in area as shown at 20 in Fig. 3 of the drawing, and arranged to project slightly beyond the surrounding flat area 21 of the end of the electrode so that when the current is first applied that portion of the sheet in contact with the tip 20 becomes soft due to the heating effect of the welding current and will allow tip 20 to sink into adjacent sheet 10 whereupon the surrounding end portion 21 of the electrode will engage the sheet and so increase the area of contact as to abruptly reduce the heating effect of the current to a value insufficient for further melting purposes.

As shown in Figs. 4 and 5, the difference in the respective areas of tip 20 and the remainder of the end 21 of the electrode is relatively great but the exact determination of the areas with respect to each other will depend to some extent, upon the thickness of material to be welded, the speed at which the welds are to be made, and the current density used, and the same factors control with respect to electrodes having rounded tips as shown in Fig. 1.

It will be noted that with electrodes of the character outlined and a predetermined amount of pressure and proper current density, uniform welds are produced with speed, regularity, and economy.

What I claim is:

1. The process of welding together sheets of metal of low specific electrical resistance which consists in the initial application of electrode pressure and a current of fixed density to a relatively small area of electrode contact with sheets to be welded until the metal in said area has been melted, and subsequently increasing said area of electrode contact to check or reduce the heating effect of said current.

2. The process of welding together sheets of metal of low specific electrical resistance which consists in the application of electrode pressure and a current of fixed density to the sheets at an initially small area of electrode contact until the metal in said area has been melted, and subsequently increasing said area of electrode contact to check or reduce the heating effect of said current.

3. The process of welding together sheets of metal of low specific electrical resistance which consists in the application of a current of fixed density under electrode pressure upon a relatively small area of the sheets to be welded until the metal in said area has been melted, and subsequently increasing the area of electrode contact to check or reduce the heating effect of said current.

4. The process of welding together sheets of low specific electrical resistance which consists in the initial application of a relatively small portion of an electrode to the sheets and subjecting same to a current of fixed density until the metal in the corresponding sheet area has been melted to effect an increase in the area of electrode contact to check or reduce the heating effect of said current.

5. The process of welding together sheets of metal of low specific electrical resistance which consists in the application of electrode pressure to a relatively small area of the sheets, passing a current of predetermined density through said area until the metal therein has been melted, the melting of said metal being effective to cause an increase in the area of electrode contact to check or reduce the heating value of said current.

6. The process of welding together sheets of metal of low specific electrical resistance which consists in the application of electrode pressure to a relatively small area of the sheets, passing a current of fixed density through said area until the metal therein has been melted, whereupon the electrodes will be caused to approach each other to effect an increase in electrode contact to check or reduce the heating value of said current.

In witness whereof I have hereto set my hand this 13th day of August, 1926.

ERNEST LUNN.